(12) United States Patent  (10) Patent No.: US 7,110,186 B2
Sueyoshi  (45) Date of Patent: Sep. 19, 2006

(54) ZOOM LENS, AND AN IMAGING APPARATUS USING SUCH ZOOM LENS

(75) Inventor: Masafumi Sueyoshi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/853,200

(22) Filed: May 26, 2004

(65) Prior Publication Data
US 2005/0007678 A1  Jan. 13, 2005

(30) Foreign Application Priority Data
May 30, 2003  (JP)  ............ P2003-154760

(51) Int. Cl.
*G02B 15/14* (2006.01)
(52) U.S. Cl. .............. 359/676; 359/683; 359/684
(58) Field of Classification Search ........ 359/676, 359/683, 684
See application file for complete search history.

(56) References Cited
U.S. PATENT DOCUMENTS
6,754,446 B1* 6/2004 Hagimori et al. ......... 396/72

2002/0012174 A1* 1/2002 Horiuchi ................ 359/687

OTHER PUBLICATIONS
U.S. Appl. No. 10/558,064, filed Nov. 23, 2005, Sueyoshi.

* cited by examiner

*Primary Examiner*—Scott J. Sugarman
(74) *Attorney, Agent, or Firm*—Oblon, Spivak, McClelland, Maier & Neustadt, P.C.

(57) ABSTRACT

The zoom of this invention comprises a first lens group having a positive refracting power, a second lens group having an negative refracting power, a third lens group having a positive refracting power, a fourth lens group having a positive refracting power, and a fifth lens group having a negative refracting power from an object side in this order, wherein a zooming is carried out by moving the second and the fourth lens groups, wherein the first lens group comprises, a foreside lens group having an negative refracting power, an optical element for folding an optical path, and a backside lens group having a positive refracting power from the object side, and a condition of $1.0<\beta 5<1.9$ is satisfied, provided that an imaging power of the fifth lens group where an object distance is at infinity is $\beta 5$.

9 Claims, 12 Drawing Sheets

ZOOM LENS, AND AN IMAGING APPARATUS USING SUCH ZOOM LENS

CROSS REFERENCE TO RELATED APPLICATION

This application claims priority from Japanese Priority Document No. 2003-154760, filed on May 30, 2003 with the Japanese Patent Office, which document is hereby incorporated by reference.

BACKGROUND OF THE INVENTION

1. Field of the Invention

This invention relates to a zoom lens, and an imaging apparatus using this zoom lens as an image taking lens, and particularly to a rear focus type zoom lens suitable for a small-sized imaging apparatus such as a digital still camera, a home use video camera, and the like, and also capable of performing a zooming rate of 3 to 5 times, and an imaging apparatus using such zoom lens.

2. Description of the Related Art

In recent years, a digital still camera and a digital video camera have widely spread as home use apparatuses, and further a miniaturized design has been required to those small-sized imaging apparatuses. On this account, an image taking lens to be mounted, particularly a zoom lens is required to be miniaturized in its total length and shortened horizontal depth. Further, an improvement in the lens performance is also required for such image taking lens for a digital still camera use with reference to an increase of the number of pixels in such imaging device in addition to the miniaturized design.

It has been known, for example, that so-called rear focus type zoom lens, where a lens groups other than a first lens group which is provided at the most object side are moved to focus, are made possible to easily miniaturize a total lens system, and to obtain an imaging performance suitable for a solid state imaging device having a larger number of pixels. As such rear focus type zoom lens, a zoom lens having 5 lens groups is well known, wherein the zoom lens is configured to have a first lens group having a positive refracting power, a second lens group having a negative refracting power, a third lens group having a positive refracting power, a fourth lens group having a positive refracting power, and a fifth lens group having a negative refracting power from object side in this order, and a zooming operation is carried out by moving the second and fourth lens groups, and a focusing operation is carried out by moving the fourth lens group. For example, in the Patent Document 1 mentioned later, there is disclosed a zoom lens which satisfies following Equations (1) to (3), wherein focal lengths of the third lens group and the fifth lens group are f3, and f5, of the fifth lens group at a position where an object distance is at infinity, a focal length of the second lens group is f2, and focal lengths in this total system at a wide-end and a tele-end are fw, and ft, respectively.

$$0.8 < |f5/f3| < 2.1 \quad (1)$$

$$1.2 < |\beta 5| < 1.6 \quad (2)$$

$$0.25 < |f2|/\sqrt{fw \cdot ft} < 0.37 \quad (3)$$

Recently, it has been considered to delete a projected portion of lens system upon an image taking by folding an optical path in the middle from the first lens group to an image plane, by shortening the length of the lens when assembled in the imaging apparatus, and by setting a movable direction of the lens upon zooming operation in the up and down directions. For example, such zoom lens that comprises a first lens group having a positive refracting power, a second lens group having an negative refracting power, a third lens group having a positive refracting power, and a fourth lens group having a positive refracting power from an object side in this order is known as disclosed in a Patent Document 2 as mentioned below. That is, this conventional zoom lens is configured to include a lens construction having 4 lens groups that performs a zooming operation by moving the second and fourth lens groups, wherein the first lens group includes a first lens of a single lens having an negative refracting power, a prism for bending an optical path, and a second lens of a single lens having a positive refracting power from the object side in this order.

Patent Document 1: JP 3015192

Patent Document 2: JOP 2000-131610

By the way, in the zoom lens having the optical system where the optical path is folded by a prism, it is possible to realize further miniaturization and a low-profile model design by miniaturizing a size of the prism. However in the zoom lens disclosed in the Patent Document 2, there is a problem that if a diameter and a thickness of lenses included in the first lens group is made small, it is difficult to further miniaturize the prism because of the deterioration of the optical performance.

SUMMARY OF THE INVENTION

This invention is presented in consideration of above-mentioned problem, and it is one aspect of the present invention to propose a rear focus type zoom lens that is able to miniaturize a total lens system by further miniaturizing the prism without deteriorating an optical performance.

Further, another aspect of the present invention is to propose an imaging apparatus employing a rear focus type zoom lens that is able to miniaturize a total lens system by further miniaturizing the prism without deteriorating an optical performance.

According to the present invention, in order to solve the above problems, in the zoom lens of the present invention comprising a first lens group having a positive refracting power, a second lens group having an negative refracting power, a third lens group having a positive refracting power, a fourth lens group having a positive refracting power, and a fifth lens group having a negative refracting power form an object side in this order, a zooming operation is carried out by moving the second lens group and the fourth lens group, wherein the first lens group includes a foreside lens group having an negative refracting power, an optical element for folding an optical path, and a backside lens group having a positive refracting power from the object side in this order, and wherein if an imaging power of the fifth lens group at where an object distance is at infinity is β5, a condition of $1.0 < \beta 5 < 1.9$ is satisfied.

The zoom lens as described above includes 5 lens groups having a positive, negative, positive, positive, and an negative refracting powers from an object side in this order, and the zooming operation is performed by moving the second and fourth lens groups. In this case, the first lens group comprises a foreside lens group having an negative refracting power, an optical element for folding the optical path and a backside lens group having a positive refracting power from the object side, and the movable directions of the second and the fourth lens groups upon zooming operation are coincided whith an optical axis direction of the backside lens group of the first lens group, so that the lens system is able to be designed as a slim model. In addition, by increasing the imaging power β5 of the fifth lens group larger than 1.0 where an object distance is at infinity, it is possible to shorten the focal length of the lens groups positioned relatively closer to the object side, and is possible not only to shorten the total length of the lens system but also to make smaller an effective diameter of the foreside lens group and backside lens group of the first lens group. However, if the imaging power β5 of the fifth lens group is increased larger than 1.9, an adequate correction for the spherical aberration becomes difficult when the F-number is made smaller, and the imaging performance to the image plane becomes worse.

Further, it is preferable that the above mentioned zoom lens is configured to carry out the zooming operation from the wide-end side to the tele-end side by moving the second lens group from the object side to the image side, and also by moving the fourth lens groups from the image side to the object side. Thereby, it becomes possible to effectively perform a slim design for the lens system even in such a case where the fourth lens groups moves in one direction upon the zooming operation. Further in this case, it may be configured to perform a focusing operation by moving the second lens group. Thereby, a necessary stroke for carrying out focusing operation becomes small.

According to the present invention, the zoom lens of the present invention comprises 5 lens groups having a positive, negative, positive, positive, and an negative refracting powers from an object side in this order. In this case, it is possible to perform the zooming operation by moving the second and fourth lens groups thereof, and further, the first lens group comprises a foreside lens group having an negative refracting power, an optical element for folding an optical path, and a backside lens group having a positive refracting power from the object side in this order, and the movable direction of the second and fourth lens groups upon the zooming operation becomes an optical axis direction of the backside lens group in the first lens group, so that it is possible to perform a slim design for the lens system. In addition, by increasing the imaging power β5 of the fifth lens group larger than 1.0 where an object distance is at infinity, it is possible to shorten the focal length of the lens groups positioned relatively closer to the object side, and is possible not only to shorten the total length of the lens system but also to make smaller an effective diameter of the foreside lens group and backside lens group of the first lens group. However, if the imaging power β5 of the fifth lens group is made larger than 1.9, it is difficult to carry out an adequate correction of the spherical aberration when reducing the F-number, and the imaging performance to the image plane deteriorates. Accordingly, it is possible to perform the miniaturization of optical element in the first lens group, and the slim design of the total lens system by satisfying the above mentioned conditions to the imaging power β5 of the fifth lens group, while maintaining better optical performance.

In addition, if the above mentioned zoom lens is configured to perform the zooming operation from the wide-end side to the tele-end side by moving the second lens group from the object side to the image side and by moving the fourth lens group from the image side to the object side, it is possible to perform a slim design for the lens system while the moving direction of the fourth lens group upon zooming operation is one direction. Further in a case where it is configured to perform a focusing operation by moving the second lens group, a necessary stroke for the focusing operation becomes smaller, so it is able to shorten the total length of the lens system.

DETAILED DESCRIPTION OF THE PREFERRED EMBODIMENTS

Figure 1:
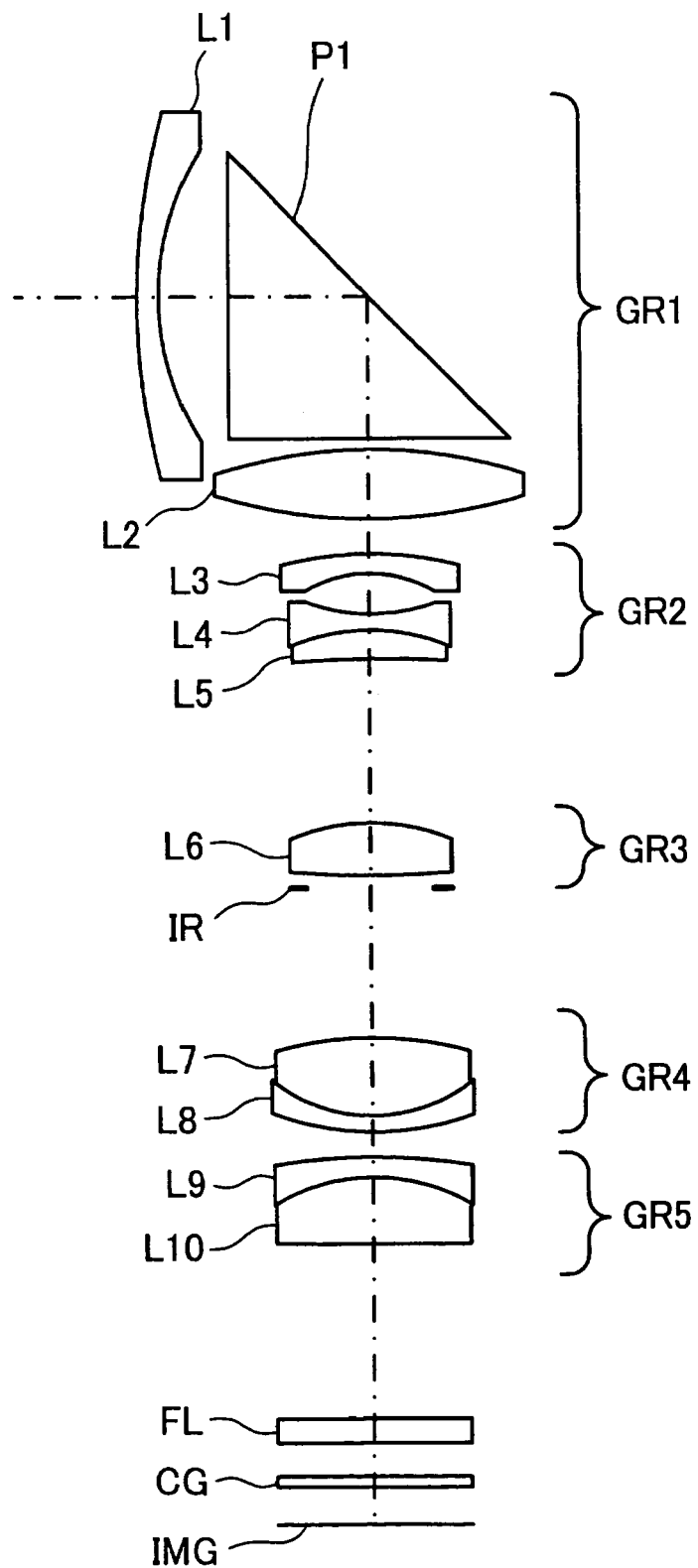
FIG. 1 is a sectional view showing a configuration of a zoom lens according to one of embodiments of the present invention.

Now, one embodiment of the present invention is described with reference to the attached drawings. FIG. 1 is a sectional view showing a configuration of a zoom lens according to one of embodiments of the present invention FIG. 1 shows a configuration of a zoom lens used as an image taking lens of an imaging apparatus such as a digital still camera and the like. In this zoom lens, a first lens group GR1 having a positive refracting power, a second lens group GR2 having an negative refracting power, a third lens group GR3 having a positive refracting power, a fourth lens group GR4 having a positive refracting power, and a fifth lens group GR5 having an negative refracting power are provided from an object side to an image plane IMG side in this order. Further at the image plane IMG side of the third lens group GR3, an irifrers IR for adjusting an amount of light, and further at the image plane IMG side of the fifth lens group GR5, a filter FL including a low pass filter such as an IR (Infra Red) cut filter and the like, and a cover glass CG of an imaging device are provided. The image plane IMG becomes an imaging plane of an imaging device such as a CCD (Charge Coupled Device), and the like.

This zoom lens is configured to carry out the zooming operation by moving the second lens group GR2 and the fourth lens group GR4 If the zooming operation is performed from the short focal length end to the long focal length end, the second lens group GR2 is moved from the object side to the image plane IMG side, and the fourth lens group GR4 is moved from the image plane IMG side to the object side, respectively. Further, this zoom lens employs a so-called rear focus type, and is possible to carry out the focusing operation by moving either fourth lens group GR4 or fifth lens group GR5.

This zoom lens is configured to carry out the zooming operation by moving the second lens group GR2 and the fourth lens group GR4. If the zooming operation is performed from the short focal length end to the long focal length end, the second lens group GR2 is moved from the object side to the image plane IMG side, and the fourth lens group GR4 is moved from the image plane IMG side to the object side, respectively. Further, this zoom lens employs a so-called rear focus type, and is possible to carry out the focusing operation by moving either fourth lens group GR4 or fifth lens group GR5.

Further the first lens group GR1 comprises a piece of lens L1 having an negative refracting power, a prism P1 for bending an optical path, and a piece of lens L2 having a positive refracting power from the object side in this order. Accordingly, a movable direction of lens upon the zooming and the focusing operations is made to be an optical axis direction of the lens L2 different from the optical axis direction of the lens L1 at the most object side. In this case, in the present invention, the lens L1 is configured to be a meniscus lens having a convex surface toward the object side, and both surfaces of the lens L2 are configured to be convex surfaces.

Further, the second lens group GR2 is configured with 3 pieces of lens L3, lens L4, and lens L5 form the object side in this order, and among them, lens surfaces between the lens L4 and the lens L5 are cemented. Further, the third lens group GR3 is configured with a piece of lens L6. Further, the fourth lens group GR4 is configured with 2 pieces of lens L7 and lens L8, and lens surfaces between the lens L7 and the lens L8 are cemented. In addition, the fifth lens group GR5 is configured with 2 pieces of lens L9 and lens L10, and lens surfaces between the lens L9 and the lens L10 are cemented.

Now, a brief summary of the present invention is described with reference to FIG. 1. The zoom lens of the present invention is configured to perform a zooming operation by a 5-lens-group construction of the first lens group GR1 to the fifth lens group GR5 having positive, negative, positive, positive and negative refracting powers respectively from an object side in this order, and by moving the second lens group GR2 and the fourth lens group GR4. Further, the first lens group GR1 includes a foreside lens group having an negative refracting power, an optical element for folding an optical path, and a backside lens group having a positive refracting power from the object side in this order. The movable direction of lens upon zooming and focusing operations becomes to be an optical axis direction of the backside lens group by constructing the first lens group GR1 as described above, so it is possible to shorten the horizontal depth of the lens system, and to always make the horizontal depth constant upon its zooming operation and focusing operation, or regardless of on/off of the power.

Further in the embodiment, a piece of lens L1 and a piece of lens L2 are provided as a foreside lens group and a backside lens group of the first lens group GR1, respectively, and a prism P1 is provided as an optical element for folding an optical path.

Further, the zoom lens of the present invention is configured to satisfy a following Equation (4).

$$1.0 < \beta 5 < 1.9 \qquad (4)$$

Provided that the imaging power of the fifth lens group GR5 is $\beta 5$ when a distance to an object is infinite. As shown in this Equation (4), in a case where the lens system is designed for the imaging power $\beta 5$ to be above the lower limit value, it is possible to shorten the focal length of the lenses which are positioned more object side than it. Thereby, it is able to shorten the total length of the lens system, and to make smaller the effective diameter of the lens in the first lens group GR1, and along with this, the optical element for folding an optical path (the prism P1 in FIG. 1) is able to be miniaturized, so the horizontal depth of the lens system can be further shortened.

On the contrary, if the imaging power $\beta 5$ becomes below the lower limit value of the Equation (4), it becomes difficult to make small particularly the effective diameter of the foreside lens group (the lens L1 in FIG. 1) in the first lens group GR1. Further if the imaging power $\beta 5$ becomes above the upper limit value of the Equation (4), it becomes impossible to adequately correct the spherical aberration when designed so as to make small the F-number, and further an exit pupil becomes close to the image plane IMG and an angle of an light incident on the imaging device is largely apart from perpendicularity, so shading and the like is generated and the imaging performance is deteriorated.

In this case, the zoom lens of the present invention is configured to satisfy with the above conditions, so the movable direction of the moving each lens group is able to be determined to be one direction upon zooming from the short focal length end to the long focal length end. Specifically, it is able to carry out the zooming operation from the short focal length end to the long focal length end by moving the second lens group GR2 from the object side to the image plane IMG side and also by moving the fourth lens group GR4 from the image plane IMG side to the object side. Further in the above mentioned zoom lens, it is possible to make relatively small the stroke of the second lens group GR2 by comparatively enlarging the variation of the zooming rate due to the move of the fourth lens group GR4.

In addition, the zoom lens zoom lens satisfying the above conditions according to the present invention is able to carry out the focusing operation by moving either the second lens group GR2 or the fourth lens group GR4, and the stroke of the lens becomes small by moving the second lens group GR2 upon carrying out the focusing operation, so it is possible to shorten the total length of the lens system.

In a conventional zoom lens of a lens system including a construction of 5 lens groups, it is common practice to move the fourth lens group GR4 to the direction of the object side at first, and then to the image plane IMG side by reversing the moving direction on the way upon gradually carrying out the zooming operation from the short focal length end to the long focal length, but in such case where the fourth lens group GR4 has an inflection point on the way of the zooming operation, there is a problem that the focusing operation with the second lens group GR2 becomes impossible in the vicinity of the inflection point. There occurs no such problems in the zoom lens of the present invention, and it becomes possible to carry out the focusing operation by moving the second lens group GR2.

As for a moving space of lens, it is necessary to decide the moving space of lens in consideration of a stroke for the focusing operation in addition to a stroke for the zooming operation, but in this case, the focusing operation at the long focal length end requires a larger stroke than the focusing operation at the short focal length end. In the case of the present invention, at the short focal length end where a necessary stroke for focusing is small, the second lens group GR2 is positioned at the most object side, and at the long focal length end where a necessary stroke for focusing is large, the second lens group GR2 is positioned at the most image plane IMG side. Accordingly, the necessary stroke of the second lens group GR2 at the object side for the focusing operation becomes small, and at the long focal length end, the stroke becomes the position between the moving second lens group GR2 and the fourth lens group GR4, so the effect which the stroke necessary for the focusing operation gives to the total length of the lens system becomes small. As the result, it is possible to shorten the total length of the lens system. Further as described above, the zoom lens of the present invention, the stroke of the second lens group GR2 upon the zooming operation is made small, so the effect of the shortening of the total length of the lens system is remarkable.

In order to carry out a lens drive upon the zooming and the focusing operations as mentioned above, it is preferable to configure for each stroke of the second lens group GR2 and the fourth lens group GR4 as to satisfy a following condition of Equation (5).

$$0.5 < |dZ2/dZ4| < 1.2 \quad (5)$$

In this case, the stroke of the second lens group GR2 from the short focal length end to the long focal length end is dZ2, and the stroke of the fourth lens group GR4 where the object distance is at infinity from the short focal length end to the long focal length end is dZ4. In this case, if it becomes below a lower limit value of the above mentioned Equation (5), it becomes necessary to enlarge the effective diameter of the fourth lens group GR4, and the thickness of the total lens system increases. On the contrary, if it becomes above an upper limit value of the Equation (5), it becomes necessary to enlarge effective diameters of the first lens group GR1 and the second lens group GR2, and the thickness of the total lens system increases in the same consideration.

Further, the zoom lens of the present invention is preferably configured to satisfy with a following Equation (6) which defines a ratio of focal lengths of the third lens group GR3 and the fifth lens group GR5.

$$|f5/f3| > 2.1 \quad (6)$$

In this case, a focal length of the third lens group GR3 is f3, and a focal length of the fifth lens group GR5 is f5. In a case where the above mentioned ratio is below the lower limit value of the Equation (6) and accordingly, when a refracting power of the fifth lens group GR5 becomes too strong, the correction of the curvature of image becomes impossible by the increase of an negative Petzval sum.

In addition, as described above, the first lens group GR1 includes the foreside lens group having an negative refracting power, the optical element for folding an optical path, and the backside lens group having a positive refracting power, and it is possible to make the effective diameter of the lens L1 and to further miniaturize the prism P1 by configuring the lens L1 with a meniscus lens having a convex shape towards the object side, and both lens surfaces of the lens L2 to be convex shapes. In such configuration, the lens L1 is preferable to be configured to satisfy with the following Equations (7) and (8).

$$neL1 > 1.8 \quad (7)$$

$$veL1 < 30 \quad (8)$$

In this case, the refraction index of the lens L1 to the e-line is neL1, and the Abbe's number based on the e-line of the lens L1 is veL1. In this case, it becomes possible to easily carry out the spherical aberration correction in the first lens group GR1 by satisfying with the condition of the Equation (7). In addition, it becomes possible to easily carry out the chromatic aberration correction in the first lens group GR1 by satisfying with the condition of the Equation (8).

Next, specific numerical examples of the zoom lens having the construction as shown in FIG. 1 are described. Each numeric value of the first embodiment is shown in Table 1. Further, Table 2 shows each value of a focal length f, a F-number, and a half field angle ω at each focal point in the first embodiment. Further, Table 3 shows an aspheric surface coefficient of a surface configured with an aspheric surface in the first embodiment.

TABLE 1

|    | SURFACE NO. | CURVATURE R | SPACE d | REFRACTION INDEX ne | ABBE'S NUMBER ve |
|----|------|---------------|------------------|---------|------|
| L1 | S1   | 18.85         | 0.65             | 1.93323 | 20.7 |
|    | S2   | 7.895         | 2.679            |         |      |
| P1 | S3   | Infinity      | 10.0             | 1.83962 | 42.8 |
|    | S4   | Infinity      | 0.2              |         |      |
| L2 | S5   | 15.469(ASP)   | 2.205            | 1.77173 | 49   |
|    | S6   | −17.407(ASP)  | 0.8 to 3.765 to 5.828 |   |      |
| L3 | S7   | 31.101        | 0.5              | 1.88815 | 40.6 |
|    | S8   | 6.777         | 1.021            |         |      |
| L4 | S9   | −8.746        | 0.45             | 1.6998  | 55.3 |
|    | S10  | 6.823         | 0.954            |         |      |
| L5 | S11  | 22.9          | 5.528 to 2.563 to 0.5 | 1.85505 | 23.6 |
| L6 | S12  | 12.202(ASP)   | 1.347            | 1.81081 | 40.5 |
|    | S13  | −43.386       | 1.0              |         |      |
| IR | S14  | —             | 6.522 to 4.142 to 1.5 | —   | —    |
| L7 | S15  | 12.708(ASP)   | 2.639            | 1.58547 | 59.2 |
|    | S16  | −5.0228       | 0.6              |         |      |
| L8 | S17  | −8.941        | 1.0 to 3.38 to 6.022 | 1.85505 | 23.6 |
| L9 | S18  | 25.643        | 0.5              | 1.81986 | 44.3 |
|    | S19  | 4.988         | 2.162            |         |      |

TABLE 1-continued

| | SURFACE NO. | CURVATURE R | SPACE d | REFRACTION INDEX ne | ABBE'S NUMBER ve |
|---|---|---|---|---|---|
| L10 | S20 | −254.055 | 7.107 | 1.48914 | 70.2 |
| FL | S21 | Infinity | 1.0 | 1.51872 | 64.0 |
| | S22 | Infinity | 1.12 | | |
| CG | S23 | Infinity | 0.5 | 1.51872 | 64.0 |
| | S24 | Infinity | 0.99 | | |
| — | IMG | Infinity | — | — | — |

TABLE 2

| | SHORT FOCAL LENGTH END | INTERMEDIATE FOCAL LENGTH | LONG FOCAL LENGTH END |
|---|---|---|---|
| f | 5.66 | 9.52 | 16.02 |
| F-number | 3.60 | 3.92 | 16.02 |
| ω | 35.11° | 21.48° | 12.97° |

TABLE 3

| SURFACE NO. | k | C4 | C6 | C8 | C10 |
|---|---|---|---|---|---|
| S5 | 0 | −0.990946E−04 | 0.356844E−05 | −0.114056E−06 | 0.205596E−08 |
| S6 | 0 | −0.246753E−04 | 0.477309E−05 | −0.172616E−06 | 0.308678E−08 |
| S12 | 0 | −0.219817E−03 | 0.864301E−06 | −0.724639E−06 | 0.886169E−07 |
| S15 | 0 | −0.211020E−03 | 0.934006E−05 | −0.427936E−06 | 0.253006E−07 |

In the Table 1 (same as later described Table 2 and Table 3), the surface numbers S1 to S24 designates an entrance face and an exit face of light at a central axis of the lenses L1 to L10, the prism P1, the iris IR, the filter FL, and the cover glass CG from the object side in this order. For example, the surface number S1 designates an object side lens surface of the lens L1, and the surface number S2 designates a lens surface at the image plane IMG side thereof. Further, the surface number S3 designates a surface of an object side of the prism P1, and the surface number S4 designates a surface of the image plane IMG side thereof. And as for the cemented lens, the cemented surfaces are designated with the same surface number. For example, the surface number S10 designates a cemented surface of the lens L4 and the lens L5.

Further, a reference code R is a curvature of respective surface, d is a space between surfaces, ne is a refraction index to the e-line, and νe is an Abbe's number based on the e-line, respectively. In the column of the curvature R, a surface designated as (ASP) following the numeric value designates that the surface is configured with an aspheric surface. Further, the space d designates a space between the surface and a surface positioned adjacent to the image plane IMG side. For example, the value for the space d written in the column for the surface number S1 designates the thickness between the object side of the lens L1 and the image plane IMG side thereof. In addition, the space d moving upon the zooming and the focusing operations is designated as the short focal length end, the intermediate focal length, and the long focal length end upon zooming operation in this order.

Further in this first embodiment, both side surfaces (S5 and S6) of the lens L2, the object side surface (S12) of the lens L6, and the object side surface (S15) of the lens L7 are configured with aspheric surfaces, respectively. The shape of the aspheric surface is expressed by following Equation (9).

$$x = \frac{y^2/r}{1+(1-\kappa \cdot y^2/r^2)^{1/2}} + C4 \cdot y^4 + C6 \cdot y^6 + C8 \cdot y^8 + C10 \cdot y^{10} \quad (9)$$

In this case, a distance from an apex of each lens surface in the optical axis direction is x, a curvature of radius is r, and a circular conic constant is κ. Further, a fourth order, a sixth order, an eighth order and a tenth order aspheric surface coefficients are C4, C6, C8, and C10, respectively, and Table 3 (same as later described Table 6 and Table 9) designates values of these aspheric surface coefficients. In addition, a character "E" in Table 3 (same as later described Table 6 and Table 9) means an exponential notation to base 10.

As like the first embodiment, by configuring at least one of lens surfaces of the lens included in the first lens group GR1 with an aspheric surface, it is possible to correct the distortion and to miniaturize the prism P1 by making the effective diameter of the lens L1 small. Further in the fifth lens group GR5, the cemented surface (S19) of the lens L9 and the lens L10 are configured to be a convex shape toward the object side, so it is possible to correct a chromatic aberration and to reduce a sensitivity of the fifth lens group GR5 with respect to the deterioration of the lens performance. In this case, it is possible to avoid a slant of the image plane by the decentering within the lens group, to reduce the amount of emergence of the coma aberration, and also to make the manufacture easy.

Figure 2:
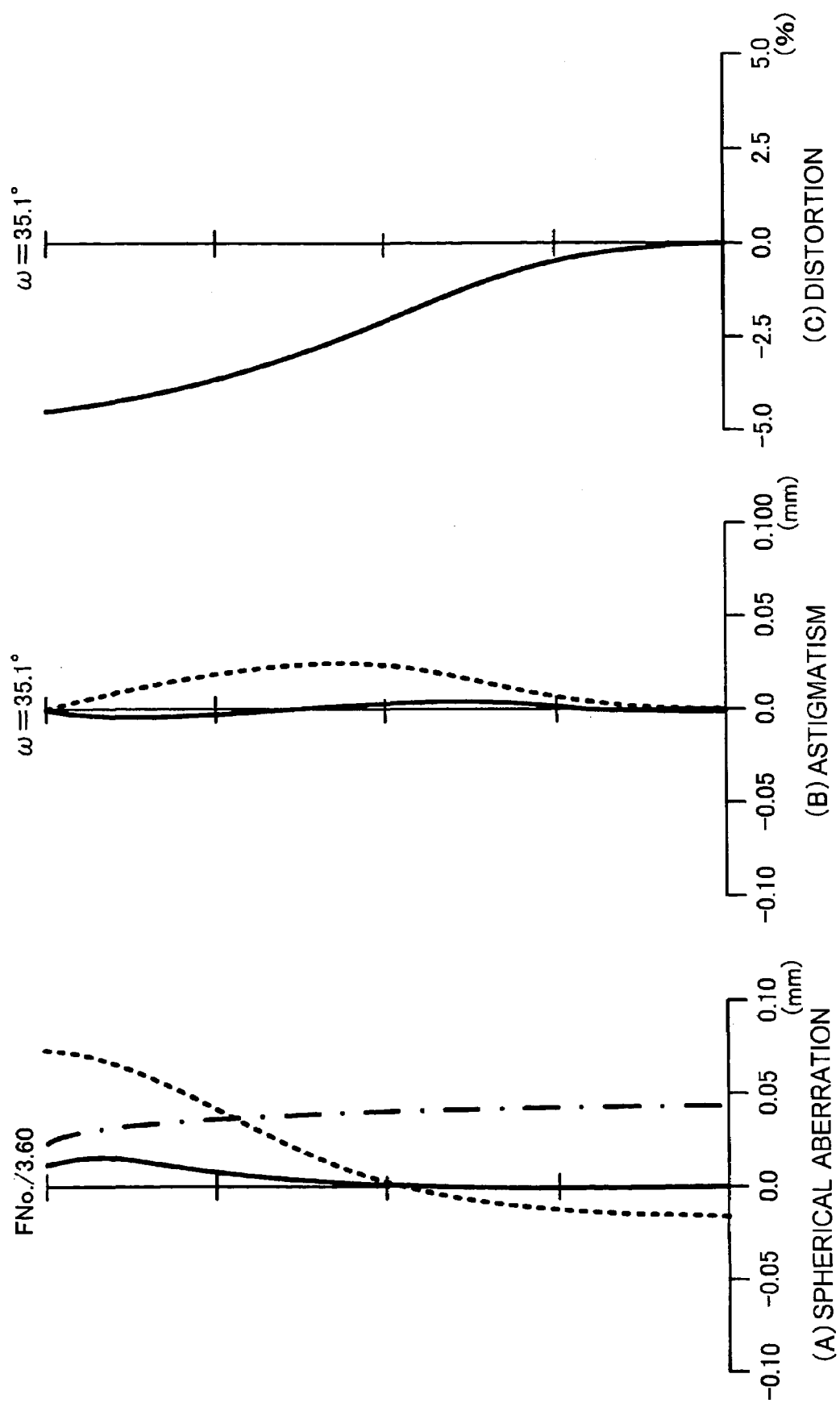
FIG. 2 is a various aberration chart at a short focal length end in a first embodiment.
Figure 3:
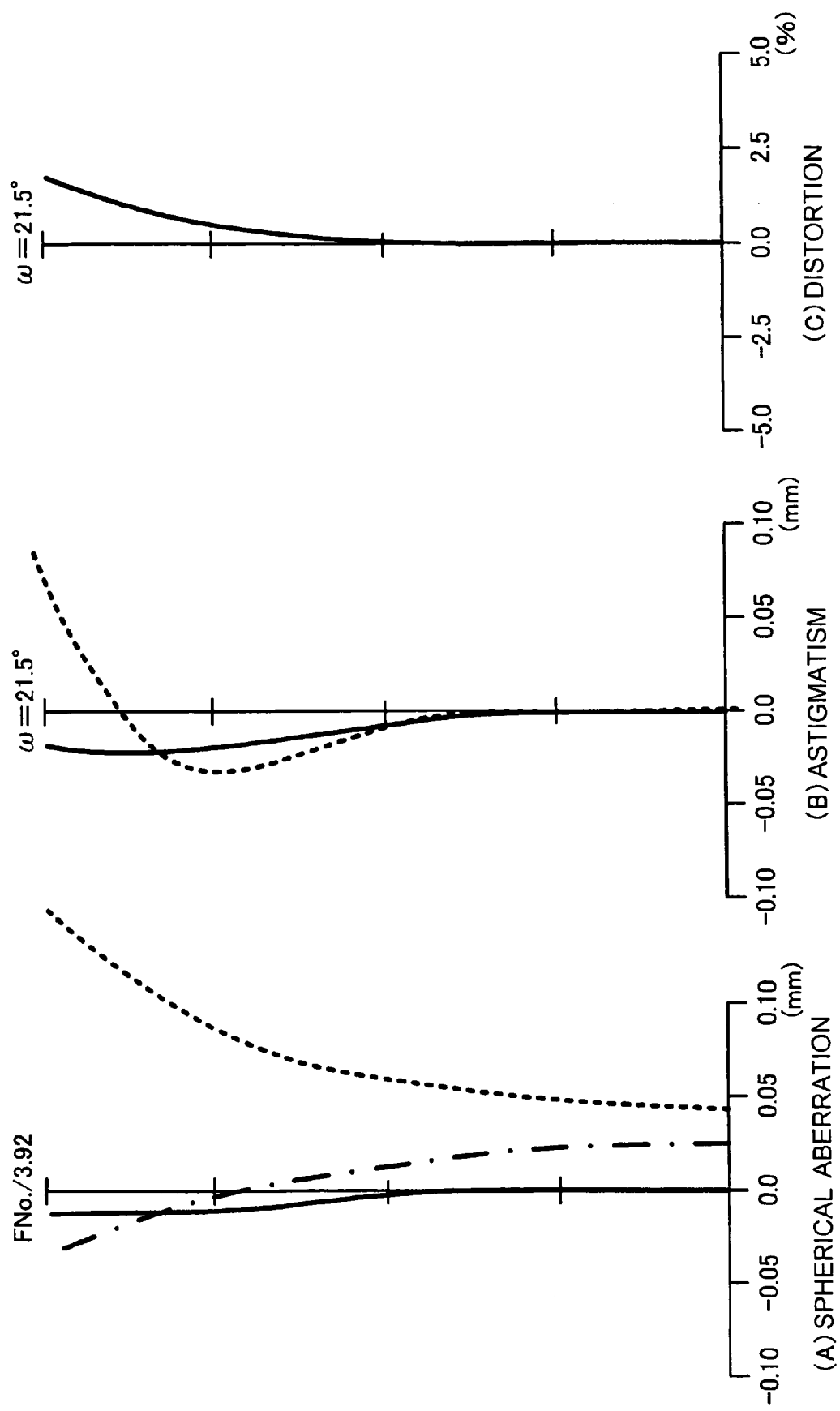
FIG. 3 is a various aberration chart at an intermediate focal length in the first embodiment.
Figure 4:
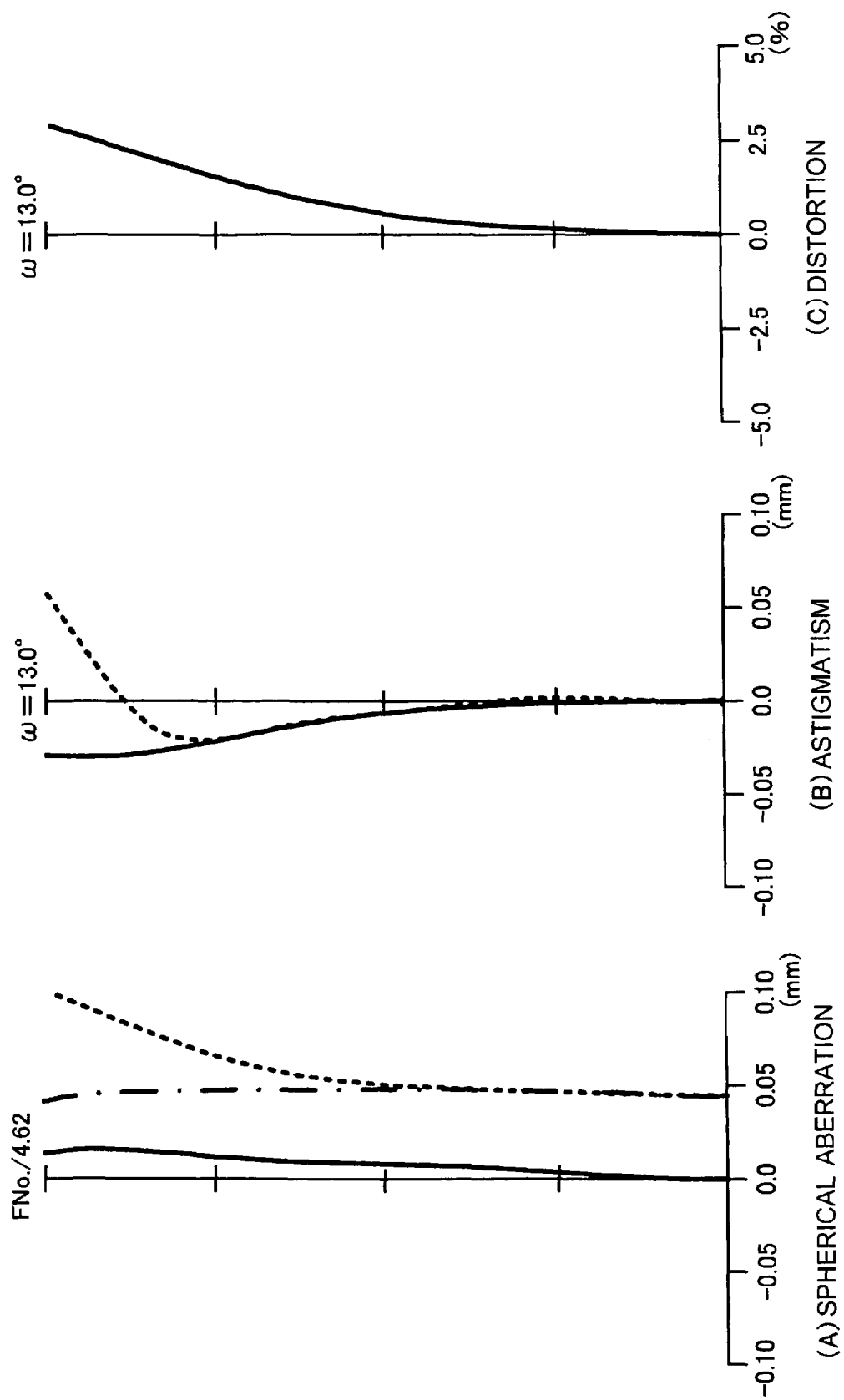
FIG. 4 is a various aberration chart at a long focal length end in the first embodiment.

FIG. 2 to FIG. 4 are various aberration charts at the short focal length end, the intermediate focal length, and the long focal length end, respectively. In this case, each chart (A) of the charts designates a spherical aberration, wherein a vertical axis is a ratio with the F-number when the shutter is opened, and a horizontal axis is a focus amount. Further, in the charts of the spherical aberrations, a real line designates an e-line (a wave length of 546.1 nm), a dotted line designates a g-line (at wavelength of 435.8 nm), and a one dot chain line designates a C-line (a wavelength of 656.3 nm), respectively. Further, each chart (B) of the charts designates an astigmatism, wherein a vertical axis is an image height, and a horizontal axis is a focus amount, and further a real line designates values in the sagittal image surface, and a dotted line designates values in a meridional image surface. Further, each chart (C) of the charts designates a distortion, wherein a vertical axis is an image height, and a horizontal axis is a ratio (%). These are the same in later described FIG. 5 to FIG. 10.

Next, the second embodiment is described. Table 4 shows each of numeric values in the second embodiment. In this case, Table 5 shows each value of a focal length f, an F-number, and a half field angle ω at each focal point in the second embodiment. Further, Table 6 shows an aspheric surface coefficient of a surface formed as a aspheric surface in the second embodiment.

In this second embodiment, the both side surfaces (S5 and S6) of the lens L2, the object side surface (S12) of the lens L6, and the object side surface (S15) of the lens L7 are configured with aspheric surfaces, respectively.

In the above second embodiment, similar to the first embodiment, both side surfaces (S5 and S6) of the lens L2 of the first lens group GR1 are configured to be aspheric surfaces, so the distortion is corrected, and the prism P1 is miniaturized. In addition, the cemented surface (S19) of the cemented lens (lens L9 and lens L10) used in the fifth lens group GR5 is configured to be a convex shape toward the object side, and the chromatic aberration is corrected.

TABLE 4

|    | SURFACE NO. | CURVATURE R | SPACE d | REFRACTION INDEX ne | ABBE'S NUMBER ve |
|----|-------------|-------------|---------|---------------------|------------------|
| L1 | S1 | 16.818 | 0.9 | 1.93323 | 20.7 |
|    | S2 | 6.891 | 3.032 | | |
| P1 | S3 | Infinity | 10.0 | 1.83962 | 42.8 |
|    | S4 | Infinity | 0.2 | | |
| L2 | S5 | 20.194(ASP) | 2.227 | 1.77173 | 49 |
|    | S6 | −14.309(ASP) | 0.8 to 4.059 to 6.256 | | |
| L3 | S7 | 28.146 | 0.5 | 1.88815 | 40.6 |
|    | S8 | 6.851 | 1.067 | | |
| L4 | S9 | −10.025 | 0.45 | 1.6998 | 55.3 |
|    | S10 | 6.776 | 0.996 | | |
| L5 | S11 | 23.912 | 5.956 to 2.695 to 0.5 | 1.85505 | 23.6 |
| L6 | S12 | 11.819(ASP) | 1.349 | 1.81081 | 40.5 |
|    | S13 | −71.148 | 1.0 | | |
| IR | S14 | — | 7.12 to 4.489 to 1.5 | — | — |
| L7 | S15 | 13.230(ASP) | 2.787 | 1.58547 | 59.2 |
|    | S16 | −5.025 | 0.6 | | |
| L8 | S17 | −9.281 | 1.0 to 3.631 to 6.62 | 1.85505 | 23.6 |
| L9 | S18 | 19.92 | 0.5 | 1.81986 | 44.3 |
|    | S19 | 4.910 | 2.279 | | |
| L10 | S20 | −400.000 | 6.752 | 1.48914 | 70.2 |
| FL | S21 | Infinity | 1.1 | 1.51872 | 64.0 |
|    | S22 | Infinity | 1.12 | | |
| CG | S23 | Infinity | 0.5 | 1.51872 | 64.0 |
|    | S24 | Infinity | 0.99 | | |
| — | IMG | Infinity | — | — | — |

TABLE 5

|    | SHORT FOCAL LENGTH END | INTERMEDIATE FOCAL LENGTH | LONG FOCAL LENGTH END |
|----|------------------------|---------------------------|------------------------|
| f | 5.15 | 8.66 | 14.58 |
| F-number | 3.57 | 3.89 | 4.64 |
| ω | 37.78° | 23.42° | 14.20° |

Figure 5:
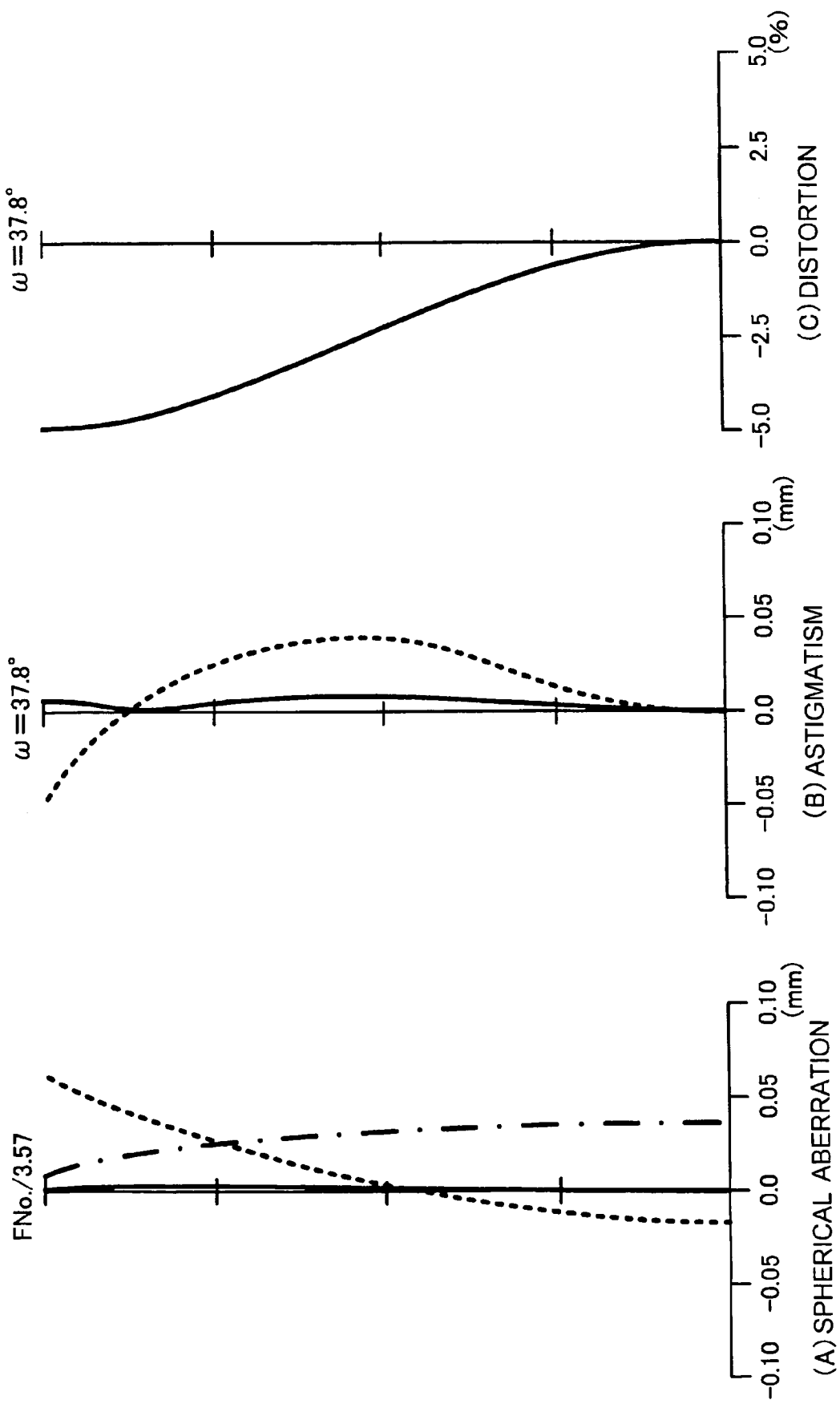
FIG. 5 is a various aberration chart at a short focal length end in a second embodiment.
Figure 6:
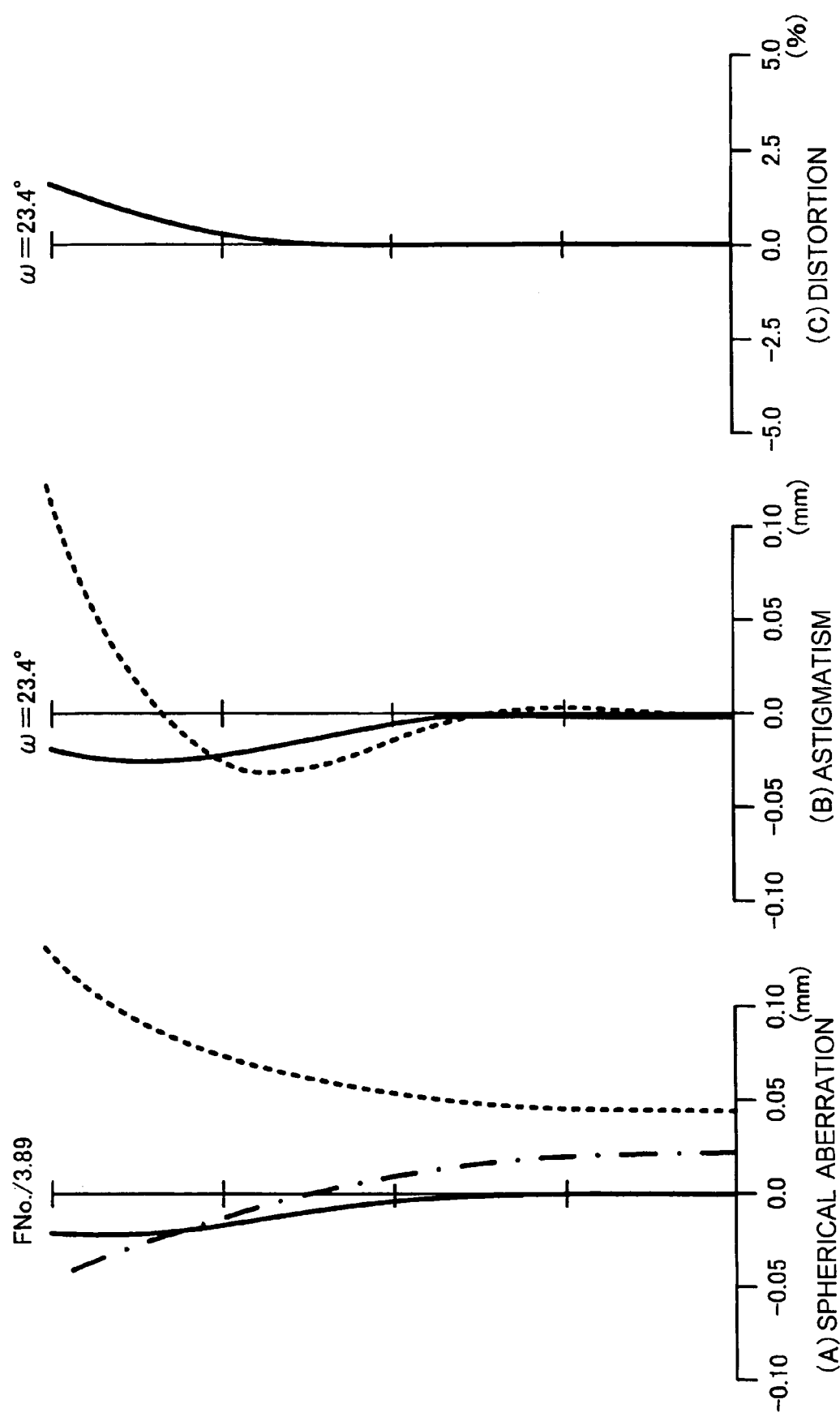
FIG. 6 is a various aberration chart at an intermediate focal length in the second embodiment.
Figure 7:
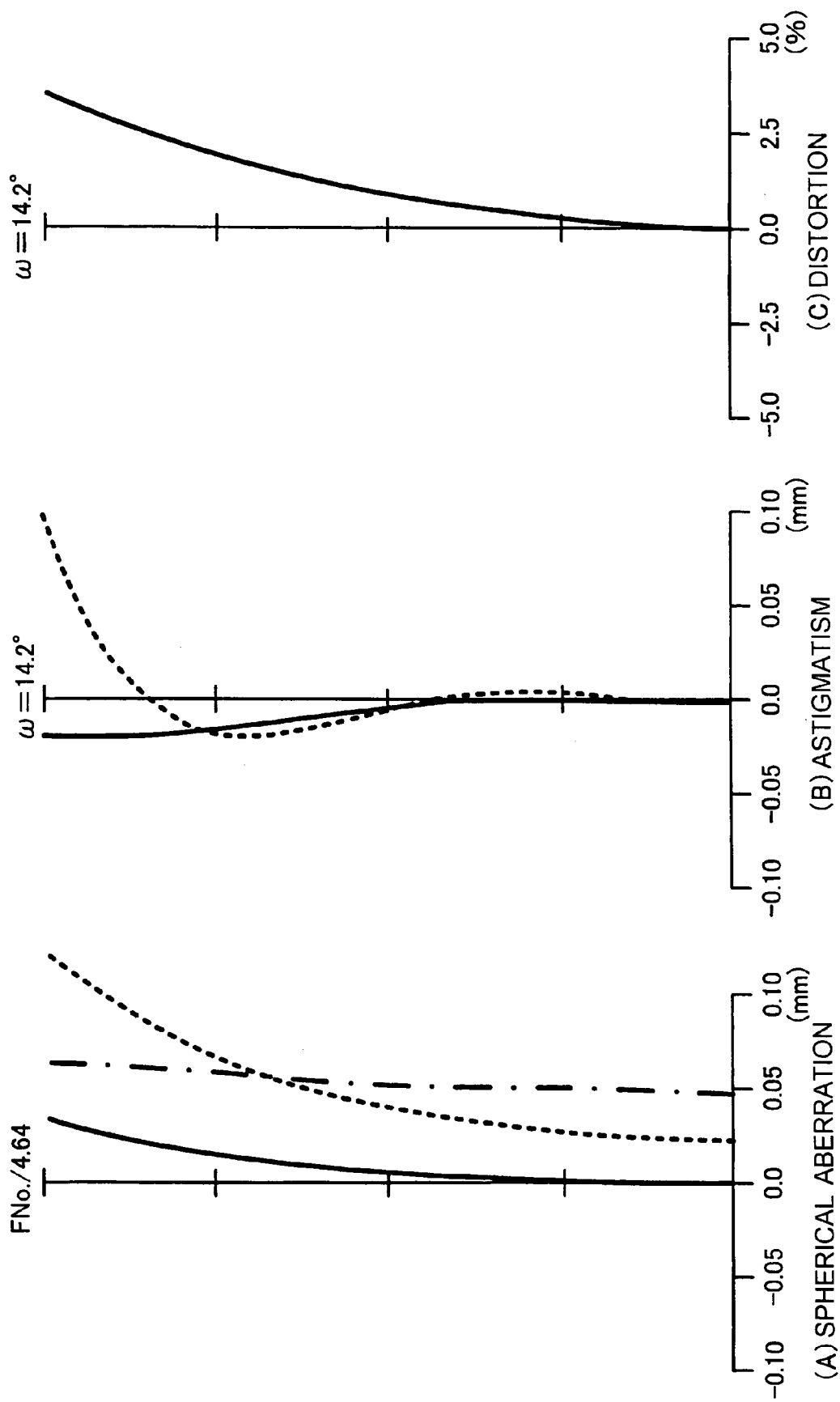
FIG. 7 is a various aberration chart at a long focal length end in the second embodiment.

FIG. 5 to FIG. 7 are various aberration charts at a short focal length end, an intermediate focal length, and a long focal length end, respectively. At each chart, each chart (A) designates a spherical aberration, a chart (B) designates an astigmatism, and a chart (C) designates a distortion.

Next, a third embodiment is described. Table 7 shows each of numeric values in the third embodiment. Further, the Table 8 shows each value of a focal length f, a F-number, and a half field angle c at respective focal point. Further, the Table 9 shows an aspheric surface coefficient of a surface formed as an aspheric surface in the third embodiment.

TABLE 6

| SURFACE NO. | k | C4 | C6 | C8 | C10 |
|-------------|---|------|------|------|------|
| S5 | 0 | −0.123023E−03 | 0.647597E−05 | −0.273536E−06 | 0.731890E−08 |
| S6 | 0 | −0.543948E−04 | 0.715252E−05 | −0.312731E−06 | 0.797487E−08 |
| S12 | 0 | −0.210634E−03 | −0.133435E−05 | 0.240134E−06 | −0.734445E−08 |
| S15 | 0 | −0.135241E−03 | 0.937743E−05 | −0.447298E−06 | 0.277759E−07 |

TABLE 7

| | SURFACE NO. | CURVATURE R | SPACE d | REFRACTION INDEX ne | ABBE'S NUMBER ve |
|---|---|---|---|---|---|
| L1 | S1 | 18.626 | 0.9 | 1.93323 | 20.7 |
| | S2 | 7.970 | 3.913 | | |
| P1 | S3 | Infinity | 12.0 | 1.83962 | 42.8 |
| | S4 | Infinity | 0.2 | | |
| L2 | S5 | 18.475(ASP) | 2.467 | 1.77173 | 49.0 |
| | S6 | −16.163(ASP) | 0.75 to 3.536 to 5.216 | | |
| L3 | S7 | 17.109 | 0.5 | 1.88815 | 40.6 |
| | S8 | 5.654 | 1.275 | | |
| L4 | S9 | −8.111 | 0.45 | 1.70559 | 40.9 |
| L5 | S10 | 5.626 | 1.041 | 1.93323 | 20.7 |
| | S11 | 17.256 | 4.966 to 2.180 to 0.5 | | |
| L6 | S12 | 12.978(ASP) | 1.288 | 1.81081 | 40.5 |
| | S13 | −34.489(ASP) | 1.0 | | |
| IR | S14 | — | 8.246 to 5.123 to 1.5 | — | — |
| L7 | S15 | 14.072(ASP) | 3.077 | 1.58547 | 59.2 |
| L8 | S16 | −4.843 | 0.6 | 1.85505 | 23.6 |
| | S17 | −8.763 | 1.0 to 4.123 to 7.746 | | |
| L9 | S18 | 15.203 | 0.5 | 1.81986 | 44.3 |
| L10 | S19 | 4.980 | 2.538 | 1.48914 | 70.2 |
| | S20 | −100.0 | 5.492 | | |
| FL | S21 | Infinity | 1.0 | 1.51872 | 64.0 |
| | S22 | Infinity | 1.12 | | |
| CG | S23 | Infinity | 0.5 | 1.51872 | 64.0 |
| | S24 | Infinity | 0.99 | | |
| — | IMG | Infinity | — | — | — |

TABLE 8

| | SHORT FOCAL LENGTH END | INTERMEDIATE FOCAL LENGTH | LONG FOCAL LENGTH END |
|---|---|---|---|
| f | 4.40 | 7.40 | 12.45 |
| F-number | 3.56 | 3.93 | 4.93 |
| ω | 42.27° | 26.89° | 16.50° |

TABLE 9

| SURFACE NO. | k | C4 | C6 | C8 | C10 |
|---|---|---|---|---|---|
| S5 | 0 | −0.160836E−03 | 0.858892E−05 | −0.303811E−06 | 0.619147E−08 |
| S6 | 0 | −0.619020E−04 | 0.992205E−05 | −0.376070E−06 | 0.736266E−08 |
| S12 | 0 | −0.252116E−03 | −0.983812E−05 | 0.315849E−05 | −0.453587E−06 |
| S15 | 0 | −0.104660E−03 | 0.948091E−05 | −0.498136E−06 | 0.314417E−07 |

Figure 8:
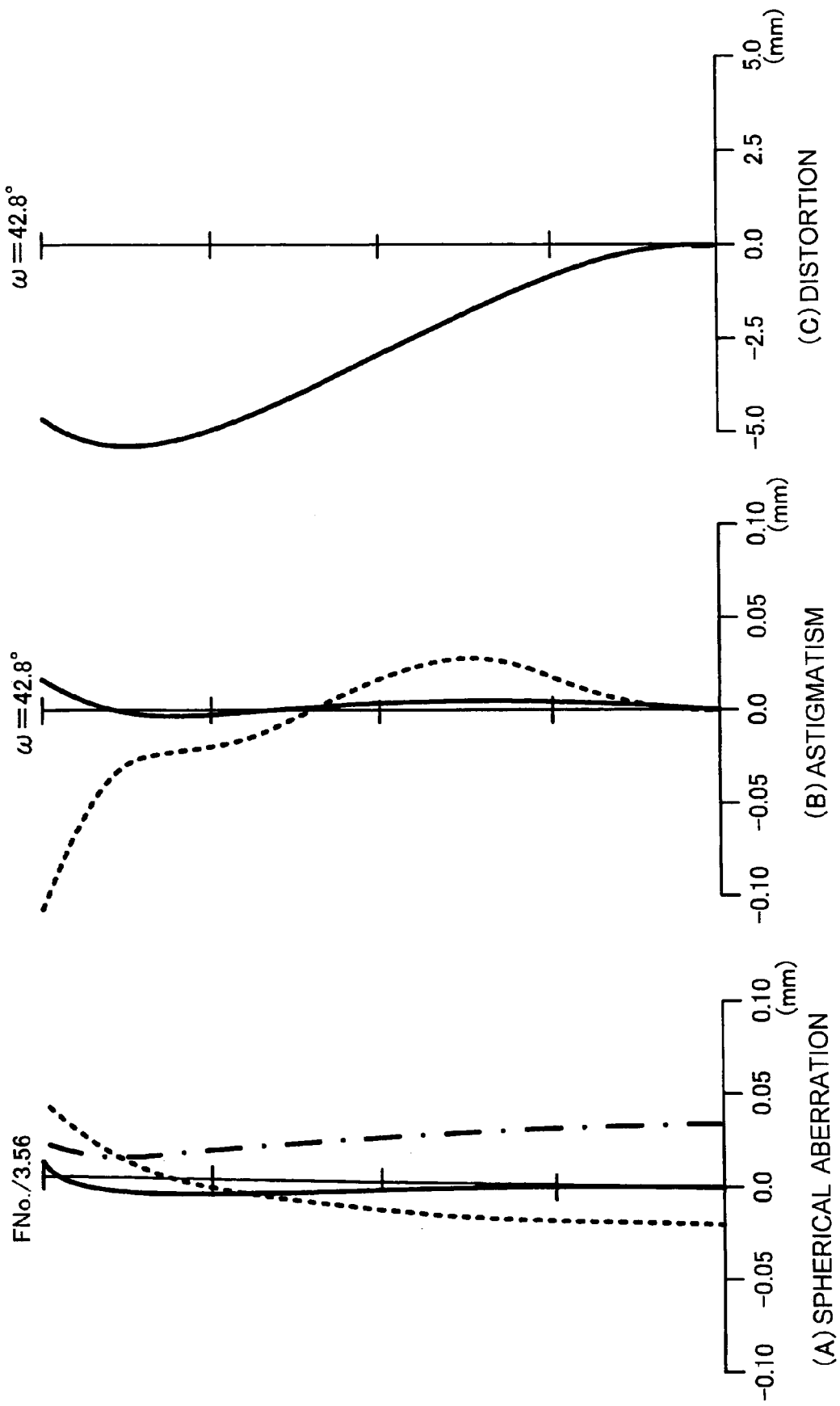
FIG. 8 is a various aberration chart at a short focal length end in a third embodiment.
Figure 9:
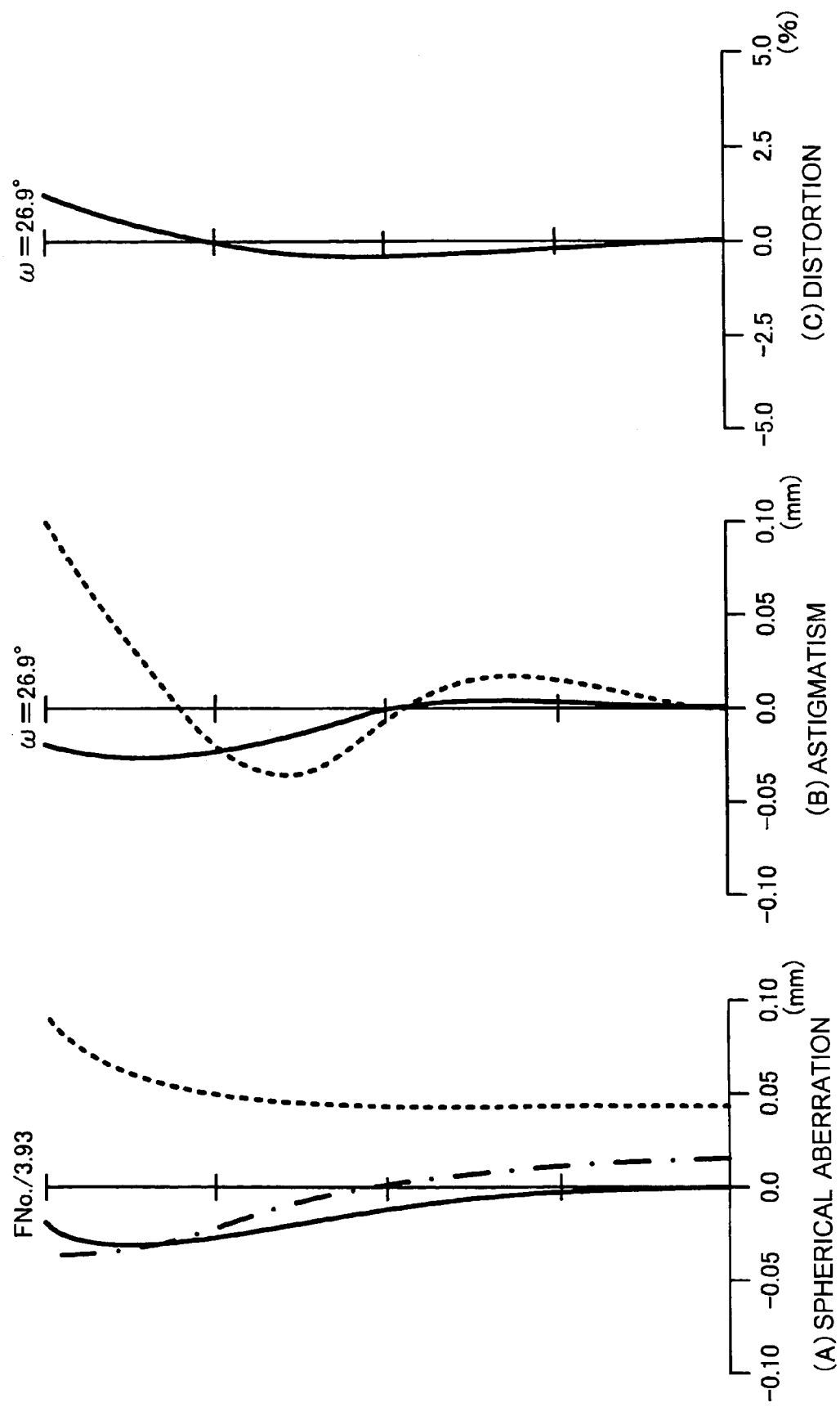
FIG. 9 is a various aberration chart at an intermediate focal length in the third embodiment.
Figure 10:
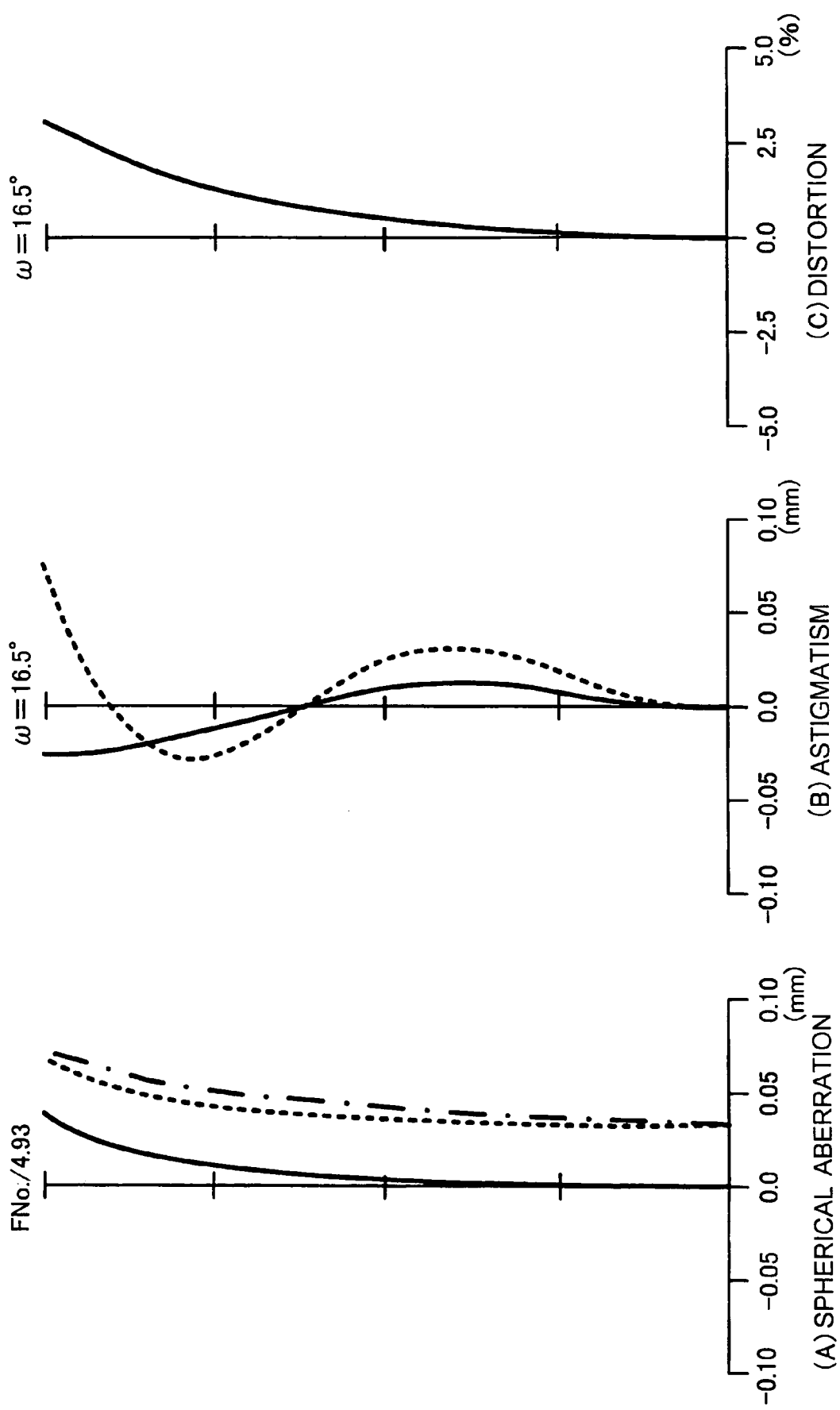
FIG. 10 is a various aberration chart at a long focal length end in the third embodiment.

FIG. 8 to FIG. 10 are various aberration charts at a short focal length end, an intermediate focal length, and a long focal length end, respectively. At each chart, a chart (A) designates a spherical aberration, a chart (B) designates an astigmatism, and a chart (C) designates a distortion.

In a Table 10, numeric values for finding conditions at each of Equations (4) to (8) in the first, second, and third embodiments are shown.

In this third embodiment, the both side surfaces (S5 and S6) of the lens L2, the object side surface (S12) of the lens L6, and the object side surface (S15) of the lens L7 are configured respectively by an aspheric surface.

In the above mentioned third embodiment, similar to the first embodiment, both side surfaces (S5 and S6) of the lens L2 in the first lens group GR1 are configured to be aspheric surfaces, the distortion is corrected, and the prism P1 is miniaturized. In addition, the cemented surface (S19) of the cemented lens (lens L9 and lens L10) used in the fifth lens group GR5 is configured to be a convex shape towards the object side, and the chromatic aberration is corrected.

TABLE 10

| | FIRST EMBODIMENT | SECOND EMBODIMENT | THIRD EMBODIMENT |
|---|---|---|---|
| Eq. (4): β5 | 1.40 | 1.30 | 1.09 |
| Eq. (5): |dZ2/dZ4| | 1.00 | 0.971 | 0.662 |
| Eq. (6): |f5/f3| | 2.42 | 2.93 | 9.32 |
| Eq. (7): neL1 | 1.93323 | 1.93323 | 1.93323 |
| Eq. (8): veL1 | 20.7 | 20.7 | 20.7 |

As shown in the Table 10, the above-mentioned first to third embodiments satisfy each condition of the Equations (4) to (8). Further as apparent form the various aberration charts in FIG. 2 to FIG. 10, it is clear that various aberrations are corrected with good balances at the short focal length end, the intermediate focal length, and the long focal length end in each of embodiments. Accordingly, a preferable zoom lens is realized as a zoom lens for an imaging apparatus having a zooming rate of around three times, and particularly for a digital still camera having a larger number of pixels.

Figure 11:
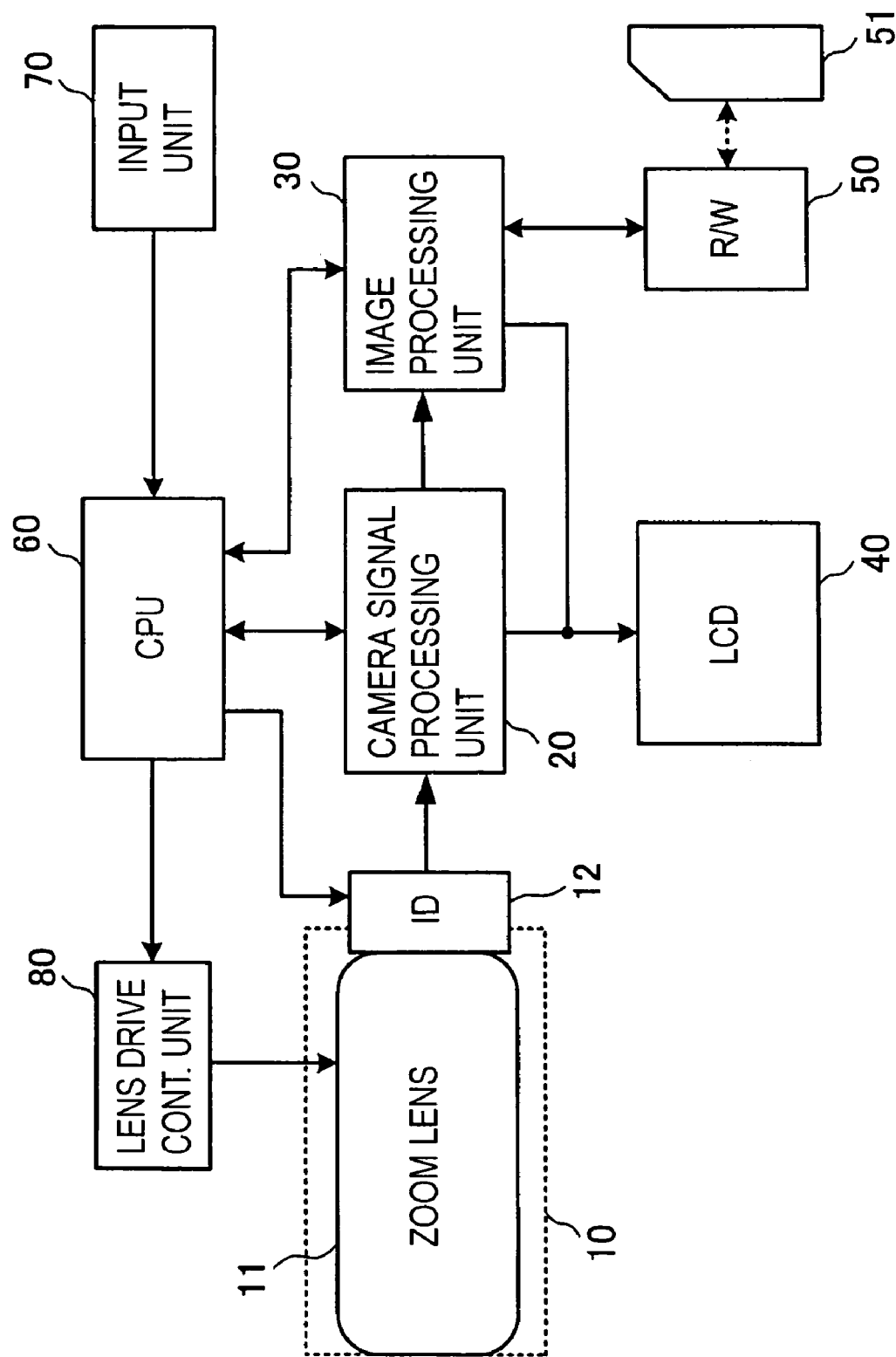
FIG. 11 is a block diagram of an exemplified configuration of a digital still camera to which a zoom lens of the present invention is able to be mounted.

Now, one embodiment of the imaging apparatus employing the above mentioned zoom lens is described. FIG. 11 is a block diagram showing one exemplified configuration of a digital still camera capable of mounting the zoom lens of the present invention.

The digital still camera in FIG. 11 comprises a camera block 10 having an imaging function, a camera signal processing unit 20 for carrying out signal processing such as an analog-digital conversion and the like for the imaged image signal, an image processing unit 30 for carrying out processing for writing and reading, an LCD (Liquid Crystal Display) 40 for displaying the picked-up image signal, that is, a taken image or the like, an R/W (Reader/Writer) 50 for reading out from and writing in to the memory card 51, a CPU 60 for controlling the digital still camera in total, an input unit 70 for operation input by a user, and a lens drive control unit 80 for controlling a drive of lenses within the camera block 10.

The camera block 10 comprises an optical system including a zoom lens 11 of the present invention, an imaging device 12 such as CCD and the like. The camera signal processing unit 20 carries out a signal processing such as a digital signal conversion of the output signal from the imaging device 12, a noise elimination, an image quality correction, a conversion to a luminance signal and a pair of color difference signals, and the like. The image processing unit 30 carries out the compression coding and expansion decoding processing of the image signal, and conversion processing for the data specification such as resolution and the like based on the predetermined image data format.

The memory card 51 is a detachable semiconductor memory, for example. The R/W 50 writes the image data encoded by the image processing unit 30 into the memory card 51, and reads out the stored image data from the memory card 51. The CPU 60 is a control processing unit to control each of circuit blocks within the digital still camera, and controls the each of circuit blocks based on a command input signal from the input unit 70 or the like.

The input unit 70 is configured to have a shutter release button for a shutter operation, and a selection switch for selecting operation modes and the like, and supplies a command input signal depending on the operation by a user to the CPU 60. The lens drive control unit 80 controls a motor or the like (not shown) for controlling a lens within the zoom lens 11 based on the control signal from the CPU 60.

The operation of the digital still camera is briefly described as follows. In a standby condition for taking an image, the image signal imaged by the camera block 10 is supplied to the LCD 40 by way of the camera signal processing unit 20 under the control of the CPU 60, and displayed as a camera-through image. Further, when the command input signal for a zooming operation is entered from the input unit 70, the CPU 60 outputs a control signal to the lens drive control unit 80, and a predetermined lens within the zoom lens 11 is moved based on the control by the lens drive control unit 80.

In addition, when a shutter (not shown in the figure) of the camera block 10 is activated by the command input signal from the input unit 70, the picked-up image signal is supplied from the camera signal processing unit 20 to the image processing unit 30, is carried out a compressed coding processing, and is converted into digital data of a predetermined data format. Thus the converted data is outputted to the R/W 50, and is written into the memory card 51.

When the shutter release button is half-depressed, full-depressed for writing operation, or the like, for example, the focusing operation is carried out by moving a predetermined lens within the zoom lens 11 by the lens drive control unit 80 based on the control signal from the CPU 60.

Further in case of reading out the image data written in the memory card 51, a predetermined image data is read out from the memory card 51 by the R/W 50 in response to the operation in the input unit 70, after being performed an expansion decoding processing, thus the read out image signal is outputted to the LCD 40. Thus, the read out image signal is displayed.

Figure 12:
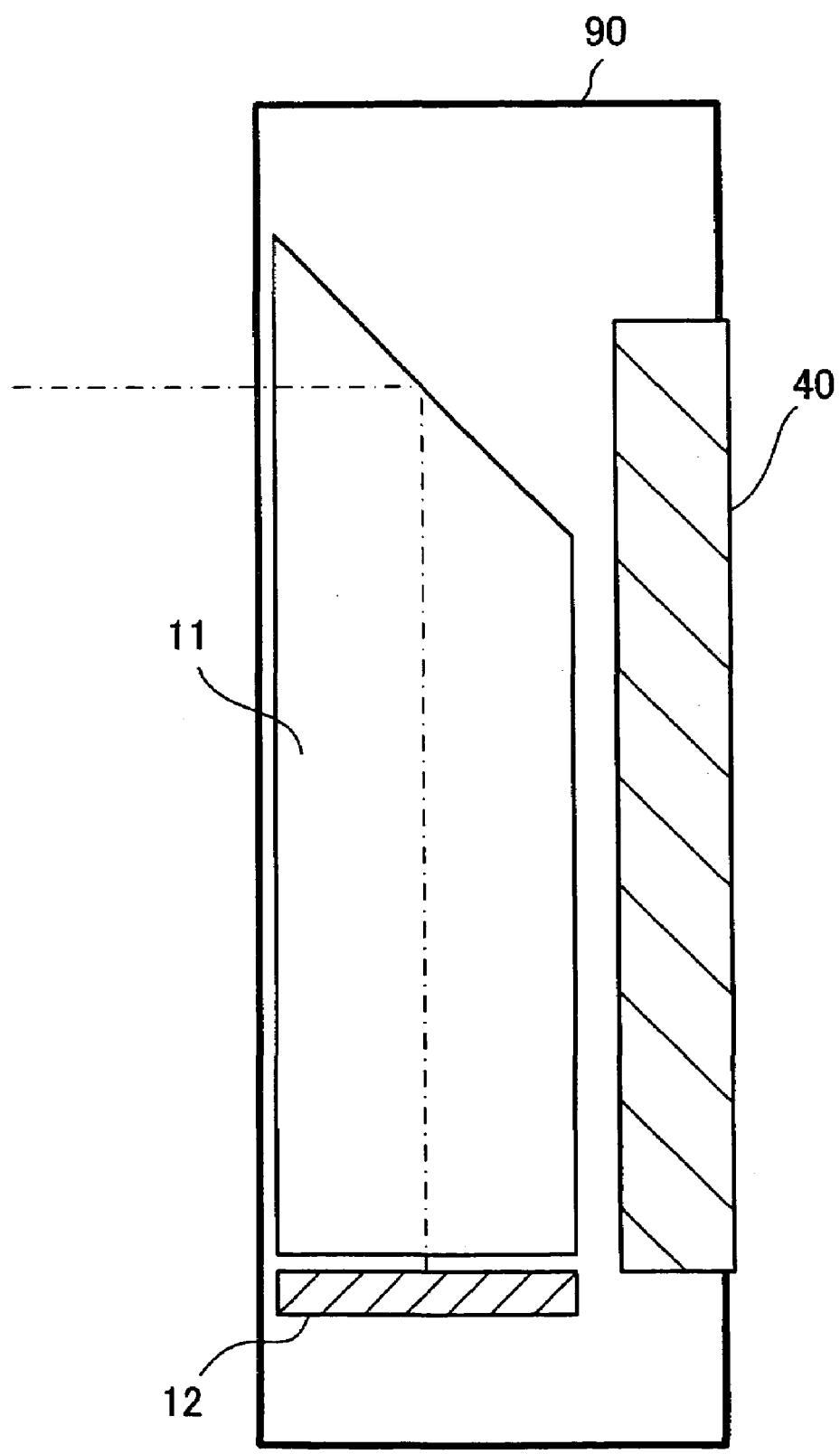
FIG. 12 is a sectional view of a camera body in a digital still camera as one of an embodiment of the present invention.

FIG. 12 is a sectional view showing an assembled structure of parts in the digital still camera. In FIG. 12, an inside of the digital still camera is shown in a case where an object exists at left side in the drawing. The zoom lens 11 is accommodated inside of the camera body 90, and the imaging device 12 is provided lower side thereof. Further, the LCD 40 is provided at the camera body 90 side opposing to the object, and is used to adjust an image angle.

The zoom lens of the present invention is so configured to be able to carry out zooming and focusing operations by bending an optical axis of a light from an object with a prism, and further by moving a predetermined lens along with the direction (up-down direction in the figure) of the bent optical axis. Accordingly, it is possible to carry out the imaging without projecting the zoom lens 11 from the camera body 90, and to shorten the horizontal depth of the camera body upon taking the image. In addition to this, the zoom lens 11 is designed to satisfy with the above mentioned conditions, so a further slim design and a miniaturization in the up-down direction of the camera body 90 become possible, the zooming operation around 3 to 5 times is possible, and further it is possible to obtain a high quality taking image having less aberration at every focal lengths.

Further, in the above embodiment, it is described a case where the zoom lens of the present invention is applied to a digital still camera, but it is possible to apply to other imaging apparatus such as a video camera and the like.

What is claimed is:

1. A zoom lens comprising:
a first lens group having a positive refracting power; a second lens group having a negative refracting power; a third lens group having a positive refracting power; a fourth lens group having a positive refracting power; and a fifth lens group having a negative refracting power from an object side in this order, wherein
a zooming operation is carried out by moving the second lens group and the fourth lens group, wherein;
said first lens group includes;
a foreside lens group having a negative refracting power;
an optical element for folding an optical path; and
a backside lens group having a positive refracting power from the object side in this order, and wherein;

a condition of $1.0<\beta 5<1.9$ is satisfied, provided that an imaging power of the fifth lens group where an object distance is at infinity is $\beta 5$;

the zooming operation from a wide-end side to a tele-end side is carried out by moving the second lens group from the object side to the image plane side and by moving the fourth lens group from the image plane side to the object side; and a condition of $0.5<|dZ2/dZ4|<1.2$ is satisfied, provided that a stroke from a short focal length end to a long focal length end is dZ2, and a stroke of the fourth lens group from the short focal length end to the long focal length end where an object distance is at infinity is dZ4.

2. A zoom lens comprising:

a first lens group having a positive refracting power; a second lens group having a negative refracting power; a third lens group having a positive refracting power; a fourth lens group having a positive refracting power; and a fifth lens group having a negative refracting power from an object side in this order, wherein a zooming operation is carried out by moving the second lens group and the fourth lens group, wherein;

said first lens group includes;

a foreside lens group having a negative refracting power;

an optical element for folding an optical path; and a backside lens group having a positive refracting power from the object side in this order, and wherein;

a condition of $1.0<\beta 5<1.9$ is satisfied, provided that an imaging power of the fifth lens group where an object distance is at infinity is $\beta 5$; and the zooming operation from a wide-end side to a tele-end side is carried out by moving the second lens group from the object side to the image plane side and by moving the fourth lens group from the image plane side to the object side, whitout moving the third lens group.

3. The zoom lens as cited in claim 1, wherein;

a focusing operation is carried out by moving the second lens group.

4. The zoom lens as cited in claim 2, wherein;

a condition of $|f5/f3|>2.1$ is satisfied, provided that a focal length of the third lens group is f3, and a focal length of the fifth lens group is f5.

5. The zoom lens as cited in claim 2, wherein;

one of surfaces of lens included in the first lens group is configured to be an aspheric surface.

6. The zoom lens as cited in claim 2, wherein;

the fifth lens group comprises a cemented lens having a cemented surface in which a surface opposed to the object side is configured to be a convex surface.

7. The zoom lens as cited in claim 2, wherein;

said foreside lens group comprises a piece of meniscus lens formed to be a convex shape towards the object side and having an negative refracting power;

said optical element comprises a prism; and said backside lens group comprises a piece of lens in which both surfaces are formed to be convex shapes.

8. A zoom lens comprising:

a first lens group having a positive refracting power; a second lens group having a negative refracting power; a third lens group having a positive refracting power; a fourth lens group having a positive refracting power; and a fifth lens group having a negative refracting power from an object side in this order, wherein a zooming operation is carried out by moving the second lens group and the fourth lens group, wherein;

said first lens group includes:

a foreside lens group having a negative refracting power;

an optical element for folding an optical path; and a backside lens group having a positive refracting power from the object side in this order, and wherein:

a condition of $1.0<\beta 5<1.9$ is satisfied, provided that an imaging power of the fifth lens group where an object distance is at infinity is $\beta 5$;

said foreside lens group includes a piece of lens having a negative refracting power;

said optical element includes a prism;

said backside lens group includes a piece of lens in which both surfaces are formed to be convex shapes; and conditions of $neL1>1.8$, and $veL1<30$ are satisfied, provided that a refraction index of the foreside lens group to an e-line is neL1, and an Abbe's number of the foreside lens group based on the e-line is veL1.

9. An imaging apparatus employing a zoom lens as an image taking lens, said zoom lens comprising:

a first lens group having a positive refracting power; a second lens group having a negative refracting power; a third lens group having a positive refracting power; a fourth lens group having a positive refracting power; a fifth lens group having a negative refracting power from an object side in this order, wherein a zooming operation is carried out by moving the second lens group and the fourth lens group, wherein;

said first lens group comprises;

a foreside lens group having an negative refracting power;

an optical element for changing an optical path; and a backside lens group having a positive refracting power from the object side in this order, and wherein;

a condition of $1.0<\beta 5<1.9$ is satisfied, provided that an imaging power of the fifth lens group where an object distance is at infinity is $\beta 5$;

the zooming operation from a wide-end side to a tele-end side is carried out by moving the second lens group from the object side to the image plane side and by moving the fourth lens group from the image plane side to the object side; and a condition of $0.5<|dZ2/dZ4|<1.2$ is satisfied, provided that a stroke from a short focal length end to a long focal length end is dZ2, and a stroke of the fourth lens group from the short focal length end to the long focal length end where an object distance is at infinity is dZ4.

* * * * *

UNITED STATES PATENT AND TRADEMARK OFFICE
CERTIFICATE OF CORRECTION

PATENT NO.        : 7,110,186 B2
APPLICATION NO.   : 10/853200
DATED             : September 19, 2006
INVENTOR(S)       : Masafumi Sueyoshi It is certified that error appears in the above-identified patent and that said Letters Patent is hereby corrected as shown below:

Column 4, Line 53, please change: "irifrers" to --iris--.

Column 4, Line 60, through Column 5, Line 3: please delete this paragraph in its entirety.

Column 11, Line 14, please delete Table 4 in its entirety and replace with the following rewritten Table 4 as shown below.

Table 4

|     | SURFACE NO. | CURVATURE R | SPACE d | REFRACTION INDEX ne | ABBE'S NUMBER ve |
|-----|-------------|-------------|---------|---------------------|------------------|
| L1  | S1          | 16.818      | 0.9     | 1.93323             | 20.7             |
|     | S2          | 6.891       | 3.032   |                     |                  |
| P1  | S3          | Infinity    | 10.0    | 1.83962             | 42.8             |
|     | S4          | Infinity    | 0.2     |                     |                  |
| L2  | S5          | 20.194(ASP) | 2.227   | 1.77173             | 49               |
|     | S6          | -14.309(ASP)| 0.8 to 4.059 to 6.256 |       |                  |
| L3  | S7          | 28.146      | 0.5     | 1.88815             | 40.6             |
|     | S8          | 6.851       | 1.067   |                     |                  |
| L4  | S9          | -10.025     | 0.45    | 1.6998              | 55.3             |
|     | S10         | 6.776       | 0.996   |                     |                  |
| L5  | S11         | 23.912      | 5.956 to 2.695 to 0.5 | 1.85505 | 23.6           |
| L6  | S12         | 11.819(ASP) | 1.349   | 1.81081             | 40.5             |
|     | S13         | -71.148     | 1.0     |                     |                  |
| IR  | S14         | -           | 7.12 to 4.489 to 1.5 | -      | -                |
| L7  | S15         | 13.230(ASP) | 2.787   | 1.58547             | 59.2             |
|     | S16         | -5.025      | 0.6     |                     |                  |
| L8  | S17         | -9.281      | 1.0 to 3.631 to 6.62 | 1.85505 | 23.6             |
| L9  | S18         | 19.92       | 0.5     | 1.81986             | 44.3             |
| L10 | S19         | 4.910       | 2.279   | 1.48914             | 70.2             |
|     | S20         | -400.000    | 6.752   |                     |                  |
| FL  | S21         | Infinity    | 1.1     | 1.51872             | 64.0             |
|     | S22         | Infinity    | 1.12    |                     |                  |
| CG  | S23         | Infinity    | 0.5     | 1.51872             | 64.0             |
|     | S24         | Infinity    | 0.99    |                     |                  |
| -   | IMG         | Infinity    | -       | -                   | -                |

UNITED STATES PATENT AND TRADEMARK OFFICE
CERTIFICATE OF CORRECTION

PATENT NO. : 7,110,186 B2
APPLICATION NO. : 10/853200
DATED : September 19, 2006
INVENTOR(S) : Masafumi Sueyoshi It is certified that error appears in the above-identified patent and that said Letters Patent is hereby corrected as shown below:

Column 12, Line 55, please change: "c" to --w--.

Column 17, Line 35, please change: "whitout" to --without--.

Signed and Sealed this

Thirty-first Day of July, 2007

JON W. DUDAS
*Director of the United States Patent and Trademark Office*